(12) United States Patent
Smith et al.

(10) Patent No.: US 7,186,671 B2
(45) Date of Patent: Mar. 6, 2007

(54) PARTICULATE ALUMINA AND PROCESS FOR REMOVING METAL IONS FROM WATER

(75) Inventors: Paul K. Smith, Rosco, IL (US); Timothy J. Badger, Scituate, MA (US)

(73) Assignee: Aquatic Treatment Systems, Inc., Scituate, MA (US)

( * ) Notice: Subject to any disclaimer, the term of this patent is extended or adjusted under 35 U.S.C. 154(b) by 287 days.

(21) Appl. No.: 10/979,705

(22) Filed: Nov. 2, 2004

(65) Prior Publication Data

US 2005/0061746 A1 Mar. 24, 2005

Related U.S. Application Data

(62) Division of application No. 10/023,022, filed on Dec. 17, 2001, now Pat. No. 6,921,739.

(60) Provisional application No. 60/260,131, filed on Jan. 5, 2001, provisional application No. 60/256,297, filed on Dec. 18, 2000.

(51) Int. Cl.
*B01J 20/00* (2006.01)
*C02F 1/42* (2006.01)

(52) U.S. Cl. .................. 502/415; 210/680; 210/688

(58) Field of Classification Search ............... 210/660, 210/688; 502/415
See application file for complete search history.

(56) References Cited

U.S. PATENT DOCUMENTS 2,739,948 A 3/1956 D'Alelio et al.

(Continued)

FOREIGN PATENT DOCUMENTS

CH 509 946 A 7/1971

(Continued)

OTHER PUBLICATIONS

Dictionary of Inorganic & Organometallic Compounds, entries for "sodium periodate," web edition 2004, downloaded Oct. 5, 2006.*

(Continued)

*Primary Examiner*—Chester T. Barry
(74) *Attorney, Agent, or Firm*—Welsh & Katz, Ltd.

(57) ABSTRACT

A water-insoluble polymeric oxidizing medium is contemplated that has a plurality of polymerized N-pyridinium vinylbenzyl triiodide or tribromide moieties whose pyridinium rings bear two substituents, $R^1$ and $R^2$, that are independently a hydrido or a $C_1$–$C_4$ alkyl group, and correspond in structure to the formula

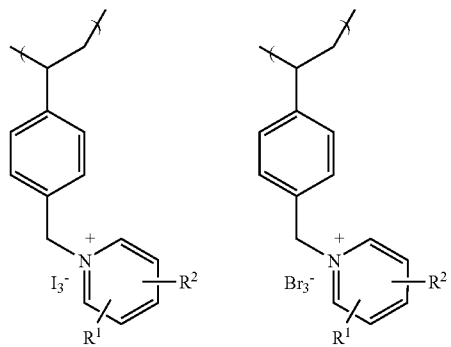

A process for preparing aseptic water and an apparatus useful for carrying out that process, both of which utilize a contemplated polymeric oxidizing medium are disclosed, as are processes for oxidizing trivalent arsenic or antimony to pentavalent arsenic or antimony and for removing arsenic from water. Alumina particles containing meta-periodate, iron or manganese are also disclosed that can be used to sorb pentavalent arsenic and antimony, as well as cobalt and mercury.

8 Claims, 3 Drawing Sheets

U.S. PATENT DOCUMENTS

| | | | |
|---|---|---|---|
| 3,499,837 A | | 3/1970 | Jaunarajs |
| 3,923,655 A | | 12/1975 | McKinney et al. |
| 3,956,118 A | | 5/1976 | Kleber et al. |
| 4,040,982 A | | 8/1977 | Basila et al. |
| 4,459,370 A | | 7/1984 | Van Der Wal et al. |
| 4,935,146 A | | 6/1990 | O'Neill et al. |
| 5,224,980 A | * | 7/1993 | Austin et al. ............ 514/231.8 |
| 5,264,133 A | | 11/1993 | Forschner et al. |
| 5,369,072 A | | 11/1994 | Benjamin et al. |
| 5,669,941 A | | 9/1997 | Peterson |
| 5,855,789 A | | 1/1999 | Smith et al. |
| 5,908,557 A | | 6/1999 | Smith et al. |
| 6,111,118 A | * | 8/2000 | Marwah et al. ............ 552/615 |

FOREIGN PATENT DOCUMENTS

| | | |
|---|---|---|
| WO | WO 96/37438 | 11/1996 |
| WO | WO 99/50182 | 10/1999 |
| WO | PCT/US01/49041 | 12/2001 |
| WO | WO 02/50164 | 6/2002 |

OTHER PUBLICATIONS

K. T. Liu and Y. C. Tong, "Oxidation with Supported Oxidants: 2. Preparation of Sulfoxides by Alumina-Supported Sodium Metaperiodate," J. of Org. Chem., 43:2717 (1978).*

R.J. Lewis, "Sax's Dangerous Properties of Industrial Materials," $9^{th}$ Edition, p. 2252 (1996) published by Van Nastrand Reinhold, New York.

"Standard Methods for the Examination of Water and Waste water," $20^{th}$ edition.

"National Compliance Assessment and Costs for the Regulation of Arsenic in Drinking Water," University of Colorado at Boulder, (Jan. 1997).

Tomoi, et al., J. Am. Chem. Soc. 103:3821 (1981).

\* cited by examiner

PARTICULATE ALUMINA AND PROCESS FOR REMOVING METAL IONS FROM WATER

CROSS-REFERENCE TO RELATED APPLICATION

This is a division of application Ser. No. 10/023,022, filed Dec. 17, 2001 now U.S. Pat. No. 6,921,739, which claims priority from U.S. Ser. No. 60/260,131, filed Jan. 5, 2001 and U.S. Ser. No. 60/256,297, filed Dec. 18, 2000, whose disclosures are incorporated herein by reference.

TECHNICAL FIELD

The present invention relates to an anti-microbial and oxidative co-polymer, and more particularly to an anti-microbial and oxidative co-polymer medium that contains polymerized N-pyridinium vinylbenzyl triiodide that is substantially free of water-elutable iodine.

BACKGROUND ART

Lambert et al., U.S. Pat. No. 3,923,655, describe the desirability of a convenient method of providing oxidation/disinfection on demand for use with potable and recreational water. Those workers note that there are relatively few ways to chemically treat water so that microorganisms are destroyed without leaving behind residual bactericide. The most commonly used treatment is that with chlorine. Other halogens such as bromine and iodine have been used much less frequently, and their usefulness has largely been left to the treatment of swimming pools. Ozone is the only other substance used in large scale treatments.

The Lambert et al. patent teaches the use of strong base anion exchange polymers containing a bactericidally effective amount of triiodide ions ($I_3^-$) for killing bacteria, while being said to be essentially free of water-elutable oxidizing iodine. The preferred strong base anion exchange resin used is a quaternary ammonium resin that is first reacted with an alkylating agent to eliminate residual tertiary amine groups.

The need for demand oxidizers/disinfectants; i.e., materials that oxidize and/or disinfect when confronted with a need for such oxidation or disinfection as when contacted with a microbe, is as great now as it was when the Lambert et al. patent was issued. Safe drinking water has become more scarce with increasing population growth, especially in underdeveloped countries where chlorination and other direct chemical treatment or boiling are not viable options. In addition, in more affluent countries, the need for microbial control water for swimming pools, decorative fountains, private wells and ponds has increased dramatically in the years since the issuance of U.S. Pat. No. 3,923,665.

The preferred resin used in the Lambert et al. disclosure is understood to be a co-polymer containing styrene and chloromethylstyrene groups that is cross-linked by divinylbenzene. Those polymerized chloromethylstyrene (vinylbenzyl chloride) groups can be reacted with trimethyl amine to form the quaternary ammonium groups of the strong base anion exchanger. Alternatively, dimethylamine can be reacted with the chloromethyl groups and the tertiary amines so formed can be quaternerized by reaction with an alkylating agent such as methyl iodide or dimethyl sulfate.

The co-polymer strong base anion exchange compositions described in the Lambert et al, patent are not widely used in the aforementioned applications because, in practice, they are found to be unstable and bleed objectionable and irritating levels of iodine into the water being treated. This finding is contrary to the express teachings of the patent.

Another problem with the alkylated strong base anion exchange materials described by Lambert et al., and particularly the alkylated quaternary ammonium materials, is that they are themselves not stable, but can decompose to form tertiary amine-containing materials, iodine and methyl iodide. Tertiary amines are poor ligands for triiodide ion and permit that ion to be easily removed. In addition, methyl iodide is listed as being a highly toxic cancer suspect agent in R. J. Lewis, *Sax's Dangerous Properties of Industrial Materials*, 9th ed., Van Nostrand Reinhold, N.Y., (1996) page 2262. Lambert et al. teach that one should realkylate a resin prior to forming the triiodide form so that any tertiary amine present would be removed.

Lambert et al. teach that one of the possibly useful resins is an N-alkylated poly(vinylpyridine) as discussed in U.S. Pat. No. 2,739,948. The preparation and use of a similar material is taught in U.S. Pat. No. 5,908,557 for the removal of arsenic anions from aqueous solutions. Those latter co-polymers are known to be incompletely quaternized and to therefore contain some unalkylated, tertiary amine. It is believed that the materials of U.S. Pat. No. 2,739,948 also contained some tertiary amine.

Arsenic poisoning of drinking water has reached catastrophic proportions in some parts of the world. In West Bengal, India, for example, an estimated 200,000 people currently suffer from arsenic-induced skin lesions, some of which have advanced to pre-cancerous hyperkeratoses. In Bangladesh, it is estimated that more than 3 million of the approximately 5 million existing wells are arsenic-contaminated, affecting up to 70 million people—tens of thousands exhibiting symptoms of arsenicosis. The international health community has suggested a target arsenic concentration of no more than 10 parts per billion (ppb) arsenic in drinking water, as compared to the present 50 ppb standard.

In the United States, arsenic in drinking water is designated as a priority contaminant under the 1986 Safe Drinking Water Act and amendments thereto. Since 1974, an arsenic Maximum Contaminant Level (MCL) of 50 ppb has been in effect in the United States. As a result of more recent findings pertaining to health risks associated with populations exposed to high concentrations of arsenic in drinking water, the United States Environmental Protection Agency (EPA) recommends the lowering of the MCL for arsenic from 50 ppb to 2 ppb.

In the United States alone, more than 12,000 public water utilities would fail to meet the more stringent proposed arsenic standard. One estimate places the cost of compliance for the 2 ppb MCL proposal in excess of $5 billion/year. The number of private wells in the United States that fail to meet the existing 50 ppb or proposed 2 ppb MCL for arsenic is unknown. It is believed that in many areas in the USA, many thousands of private wells produce drinking water with potential, serious health risks for the households depending on self-produced water because of arsenic contamination.

Arsenic is found in several oxidation states. Typically, arsenic is present in aqueous solutions in the oxidation state of plus five ($As^{+5}$, pentavalent) and to a lesser extent the oxidation state of plus three ($As^{+3}$, trivalent). There is no significant reported cation chemistry for arsenic, but organic arsenic salts are known for both oxidation states (e.g. $K[As(C_6H_4O_2)_2]$).

Examples of trivalent arsenic compounds are the halides ($AsCl_3$, $AsCl_2^+$, and $AsF_3$). The halides are readily hydrolyzed to arsenious acid ($H_3AsO_3$) or it acid-dissociated forms ($HAsO_3^{2-}$). The oxide form is $As_2O_3$. The trivalent arsenic compounds to be separated from aqueous solutions, most likely in an ionized form of $H_3AsO_3$, in a process of the invention are collectively referred to herein as "trivalent arsenic".

As⁰ can be oxidized by concentrated nitric acid to pentavalent arsenic as arsenic acid (isolable as $H_3AsO_4 \cdot \frac{1}{2}H_2O$), which is a moderately strong oxidizing agent in solution. The corresponding halides are also known (e.g. $AsCl_5$, $AsCl_4^+$). The pentavalent arsenic compounds to be separated from aqueous solutions are most likely an ionized form of $H_3AsO_4$. In a process of the invention, such pentavalent arsenic compounds are collectively referred to herein as "pentavalent arsenic".

Analytical surveys taken of drinking water around the world usually give a total arsenic level and fail to distinguish contributions from pentavalent arsenic or trivalent arsenic, even though trivalent arsenic is considerably more toxic than pentavalent arsenic. The failure to distinguish the valence of arsenic present in drinking water further confuses the logical assignment of MCL values because although a level of 2 ppb of pentavalent arsenic may cause no deleterious health effects, an equivalent level of trivalent arsenic can have negative health consequences.

There is an urgent need for a technology that will remove arsenic from drinking water to provide safe levels of arsenic regardless of the oxidation state of the arsenic in an efficient, economical and environmentally sound manner. It is desirable that such technology be flexible and sufficiently robust in order to address the requirements of large municipal water utilities, private wells in developed countries and contaminated water sources in undeveloped countries. It is also desirable that an arsenic removal method is able to remove arsenic from water without removing all of the trace minerals that contribute to its flavor.

A number of technologies have been described in the art to remove arsenic from drinking water, also known as "arsenic remediation". These technologies of the art include iron co-precipitation, reverse osmosis, alumina adsorption and classical ion-exchange with anion exchange resins. These methods can be effective at removing pentavalent arsenic, but trivalent arsenic defies efficient removal. In a report entitled "National Compliance Assessment and Costs for the Regulation of Arsenic in Drinking Water" (January, 1997) prepared by the University of Colorado at Boulder, more than a dozen putative methods are evaluated for arsenic removal efficiency and cost. None of the evaluated methods described exhibited arsenic removal efficiencies greater than 95 percent. In addition, the prior art methods do not offer the simplicity of use required for private well treatment or for less developed areas of the world where reliable electrical power is unavailable. In these situations, a "point of use" treatment is necessary or water must be transported in for use.

U.S. Pat. No. 5,908,557 describes an oxidizing and separation medium for converting trivalent arsenic into pentavalent arsenic, and removing the pentavalent form. That patent relies on the use of polymerized N-alkyl pyridinium triiodide adsorption medium to oxidize and remove the arsenic. Those polymerized N-alkyl pyridinium triiodide moieties can be depicted as shown below, wherein the parentheses are used to show that the polymerized N-alkyl pyridinium triiodide moieties are distributed repeatedly through out the co-polymer thereby forming a plurality of N-alkyl pyridinium triiodide moieties. As is noted at column 5, lines 28–31 of that patent,

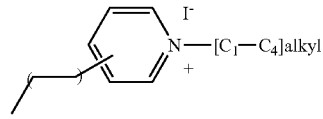

not all of the of the pyridine nitrogen atoms are alkylated, thereby leaving some tertiary pyridine nitrogens. More importantly, the presence of N-alkyl groups permits dealkylation of the polymer to occur over time leading to an increased amount of tertiary amine and a methyl halide that can be carcinogenic.

Several other common water contaminants, such as iron (II), antimony, sulfate, nitrate and color-causing contaminants can negatively influence arsenic remediation by the known methods. Classical ion-exchange with anionic resins of the art suffer from poor efficiency (90 percent), low capacity (1500 bed volumes) and severe reduction in capacity and binding efficiency when competing ions such as sulfate are present in amounts of 50 ppm or more. Classical ion-exchange media suffer from poor longevity when challenged with a matrix of hard well water. It is estimated by the aforementioned University of Colorado report that 25 percent of such classical resins would have to be replaced on an annual basis.

The currently-favored plan for removing arsenic from drinking water in Bangladesh is to permit the water to sit for several hours exposed to air, allowing the iron in the water to oxidize, which should cause arsenic to precipitate out and settle.

There remains, therefore, a need for a simple-to-use adsorbent for removing dissolved arsenic from water that is stable and that exhibits an arsenic removal efficiency greater than 95 percent. Another important consideration in water remediation is consumer acceptance. The safety, flavor and cost of the water are all important factors in the provision of drinking water.

It is thus seen that an improved co-polymer triiodide resin is needed to provide demand oxidation/disinfection. Such a material should be stable to decomposition, contain only quaternary ammonium groups while being free of tertiary amine groups, and should neither bleed iodine into surrounding water, nor decompose to form an alkyl halide. The disclosure that follows describes one such co-polymer and several of its uses.

BRIEF SUMMARY OF THE INVENTION

One aspect of the present invention contemplates a water-insoluble polymeric medium having a plurality of polymerized N-pyridinium vinylbenzyl triiodide or tribromide moieties whose pyridinium rings bear two substituents, $R^1$ and $R^2$, that are independently a hydrido or a $C_1$–$C_4$ alkyl group. An exemplary water-insoluble polymeric medium triiodide or tribromide can be illustrated by the structural formula

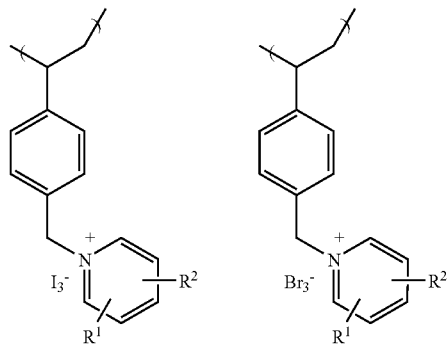

wherein the parentheses are used to show that the polymerized N-pyridinium vinylbenzyl group is distributed repeatedly through out the co-polymer thereby forming a plurality of N-pyridinium vinylbenzyl triiodide or tribromide groups. In preferred embodiments, one of the $R^1$ and $R^2$ substituents is $C_1$ alkyl group. More preferably, $R^1$ and $R^2$ substituents are both hydrido groups. Preferably, the polymeric medium has a triiodide ion content of about 0.1 to about 1.0 moles per liter, that is more preferably about 0.2 to about 0.5 moles per liter of co-polymer. The polymeric medium is preferably a solid, macroreticular chloromethylated styrene-divinylbenzene co-polymer that is reacted with pyridine or a mono- or disubstituted pyridine to form the corresponding pyridinium chloride that is further exchanged with triiodide or tribromide ions. A preferred, contemplated polymeric medium is free of water-elutable iodine or bromine, and is present as free-flowing particles.

Another embodiment contemplates a process for forming an aseptic fluid such as water or air from a fluid that contains microbial contamination. A contemplated process comprises the steps of providing a vessel containing a water-insoluble polymeric medium having a plurality of polymerized N-pyridinium vinylbenzyl triiodide or tribromide moieties (groups) of the structure

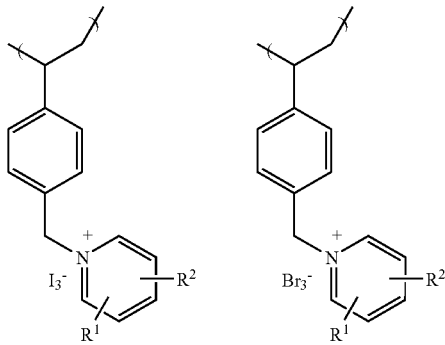

wherein $R^1$ and $R^2$ are independently a hydrido or a $C_1$–$C_4$ alkyl group. An influent of microbially contaminated fluid such as water that is clear and free from visible precipitate is introduced to the vessel to contact the insoluble medium. The fluid is maintained in contact with the insoluble medium for a time period sufficient for microbes present in the influent to be killed by the triiodide ions and form aseptic fluid. The aseptic fluid is discharged from the vessel as an effluent.

The before-noted preferences for the polymeric medium are maintained when that medium is used in a contemplated process. *Pseudomonas aeruginosa* and coliforms are particular microbes against which a contemplated polymeric medium is useful.

A process for oxidizing trivalent arsenic or antimony to pentavalent arsenic or antimony is contemplated. This process comprises the following steps.

(a) A vessel is provided that contains a water-insoluble polymeric oxidation medium comprising an oxidation medium having a plurality of oxidizing sites that are polymerized N-pyridinium vinylbenzyl triiodide or tribromide moieties (groups) of the structure

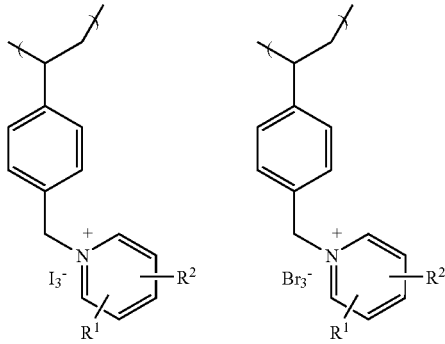

wherein $R^1$ and $R^2$ are independently a hydrido or a $C_1$–$C_4$ alkyl group.

(b) An influent aqueous solution having trivalent arsenic or antimony is introduced into the vessel to contact the insoluble oxidizing medium.

(c) The aqueous solution is maintained in contact with the insoluble oxidizing medium for a time period sufficient for the trivalent arsenic or antimony in the influent to react with the oxidizing sites to form pentavalent arsenic or antimony in the solution and reduced medium.

(d) The pentavalent arsenic-containing or antimony-containing solution is separated from the reduced medium, typically as an effluent.

A process for removing arsenic from an aqueous solution is also contemplated and comprises the following steps.

a) A vessel is provided that contains a water-insoluble polymeric oxidizing medium having a plurality of oxidizing sites that are polymerized N-pyridinium vinylbenzyl triiodide or tribromide moieties as described above.

b) A volume of an influent aqueous pre-sample solution that may contain arsenic as water-soluble ions in the trivalent or pentavalent form at a concentration greater than about 2 parts per billion is introduced into the vessel to contact the insoluble oxidizing adsorption medium.

c) The pre-sample solution is maintained in contact with the insoluble oxidizing medium for a time period sufficient for trivalent arsenic present in the influent to react with the oxidizing sites to oxidize to pentavalent arsenic and form a sample solution and reduced medium.

d) The pentavalent arsenic-containing sample solution is contacted with a pentavalent arsenic binding medium to form medium-bound arsenic and an aqueous composition.

e) The aqueous composition is discharged from the vessel as an effluent having final arsenic concentration that is significantly less, at least about 95 percent less, than the initial concentration, and typically about zero to about 2 parts per billion arsenic. A similar process can be used to remove trivalent and pentavalent antimony.

A more general process for oxidizing a water-soluble metal ion from a first oxidation state to a second, higher oxidation state is also contemplated. This process comprises the following steps.

a) A vessel is provided that contains a water-insoluble polymeric oxidizing medium having a plurality of oxidizing sites that are polymerized N-pyridinium vinylbenzyl triiodide or tribromide moieties as described above.

b) A volume of an influent aqueous solution that containing metal ions of a first oxidation state as water-soluble ions is introduced into the vessel to contact the insoluble oxidizing medium to form a solid/liquid admixture.

c) The solid/liquid admixture is maintained for a time period sufficient for the metal ions present in the influent to react with the oxidizing sites to oxidize to a second, higher oxidation state to form a sample solution and a reduced medium.

d) The sample solution is then separated from the reduced medium.

Another aspect of the invention contemplates modified particulate alumina containing meta-periodate ions substantially homogeneously sorbed throughout the particles. The meta-periodate ions are present in an amount of about 0.1 to about 0.15 molar in a gravity-settled volume of particles in deionized water.

A further aspect of the invention contemplates modified alumina particles containing iron or manganese or both substantially homogeneously sorbed throughout the particles. The iron or manganese is present in an amount of about 0.05 to about 0.15 molar in a gravity-settled volume of particles in deionized water. The particles contain an oxidized iodine species and are substantially free of molecular iodine.

A process for removing arsenic or antimony +3 or +5 ions from a water supply is also contemplated. That process comprises the following steps.

a) An aqueous solution that contains arsenic or antimony +3 or +5 ions in a concentration greater than about 2 parts per billion is contacted with modified alumina particles. Those modified alumina particles contain iron or manganese or both sorbed substantially homogeneously distributed throughout in an amount of about 0.05 to about 0.15 molar as measured in a gravity-settled volume of particles in deionized water. The particles also contain an oxidized iodine species and are substantially free of molecular iodine.

b) That contact is maintained for a time period sufficient for arsenic or antimony +3 or +5 ions present to be sorbed by the particles to form arsenic- or antimony-containing particles and an aqueous solution having a lessened amount of arsenic or antimony.

c) The arsenic- or antimony-containing particles are separated from the aqueous solution having a lessened amount of arsenic or antimony.

A still further contemplated aspect of this invention is an apparatus for preparing an aseptic fluid such as water. That apparatus comprises a vessel having an inlet, an outlet and a water-insoluble polymeric medium in a polymeric medium-containing region. The water-insoluble polymeric medium is as discussed before and is supported and contained within the medium-containing region. In one preferred embodiment, the vessel includes a first flow-permitting support positioned between the outlet and the medium-containing region. Preferably also, the vessel includes a second flow-permitting support positioned between the inlet and the medium-containing region. The inlet and outlet are preferably separated from each other, and are more preferably are at opposite ends of the apparatus.

The present invention has several benefits and advantages.

One benefit is that it provides an inexpensive oxidizing solid phase medium that can oxidize arsenic +3 and antimony +3 ions to the corresponding +5 ions, and also kill bacteria.

An advantage of the invention is that a contemplated solid phase oxidizing medium changes color as the oxidant is utilized and thereby indicates its own degree of use.

Another benefit of the invention is that the oxidant of a contemplated solid phase oxidizing medium does not bleed from the medium, which bleeding can cause off-odors to the surrounding environment.

Another advantage of the invention is that it provides a solid phase alumina-based medium that can sorb (absorb or adsorb) arsenic +5 and antimony +5 ions from aqueous media.

A further benefit of the invention is that a contemplated solid phase alumina-based medium containing sorbed arsenic +5 or antimony +5 binds those ions tightly, thereby permitting disposal of spent medium in a land fill without worry of leaching of the bound ions to the environment.

A further advantage of the invention is that a contemplated solid phase alumina-based medium containing sorbed mercury can be heated in a retort to release the mercury for collection and permit reuse of the medium.

Still further benefits and advantages of the invention will be apparent to the worker of ordinary skill from the disclosure that follows.

DETAILED DESCRIPTION OF THE INVENTION

Figure 1:
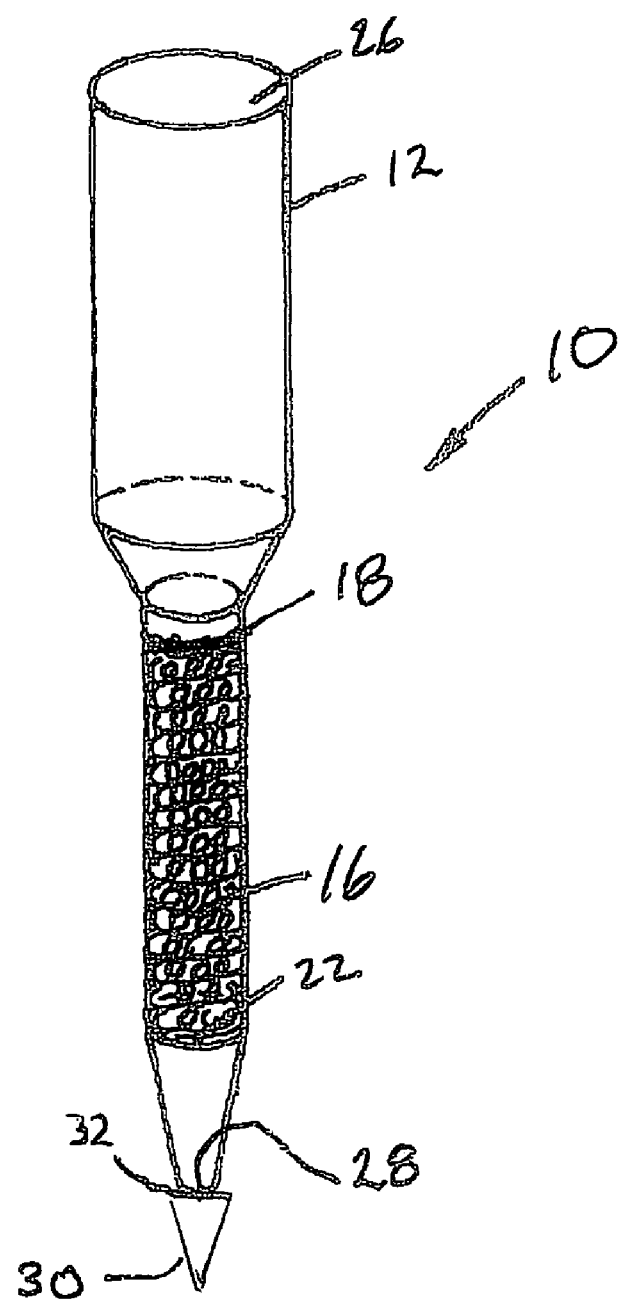
FIG. 1 shows a schematic representation of a separation vessel useful in an embodiment of the invention.

The present invention relates to an anti-microbial and oxidative water-insoluble polymeric medium (often merely referred to as a polymeric medium) and its use in the preparation of aseptic water and for converting trivalent arsenic to pentavalent arsenic ($As^{+3}$ $As^{+5}$) in such water.

Thus, one aspect of the present invention contemplates a water-insoluble polymeric oxidizing medium. A contemplated polymeric oxidizing medium is a co-polymer that has a plurality of polymerized N-pyridinium vinylbenzyl triiodide or tribromide moieties whose pyridinium rings bear two substituents, $R^1$ and $R^2$, that are independently a hydrido or a $C_1$–$C_4$ alkyl group. The polymerized N-pyridinium vinylbenzyl triiodide or tribromide moieties comprise oxidizing sites in the co-polymer medium. An exemplary water-insoluble polymeric medium is preferably a solid at ambient temperatures and can be illustrated by the structural formula

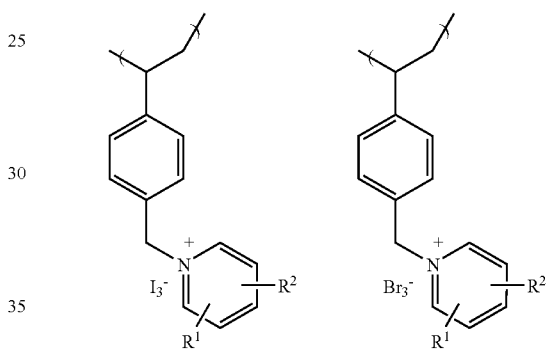

wherein the parentheses are used to show that the polymerized N-pyridinium vinylbenzyl group is distributed repeatedly through out the co-polymer thereby forming a plurality of N-pyridinium vinylbenzyl triiodide or tribromide groups. In preferred embodiments, one of the $R^1$ and $R^2$ substituents is $C_1$ alkyl group. More preferably, $R^1$ and $R^2$ substituents are both hydrido groups so that the N-pyridinium vinylbenzyl triiodide or tribromide groups of the polymeric medium corresponds in structure to the formula

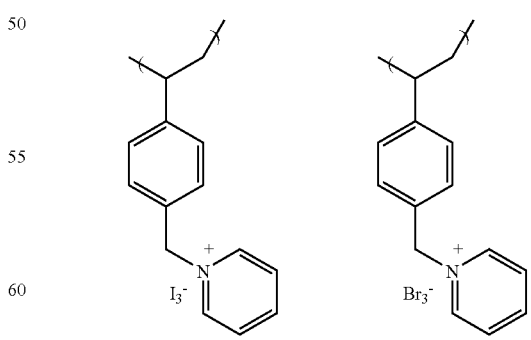

Preferably, the polymeric medium has a triiodide or tribromide ion content of about 0.1 to about 1.0 moles per liter, that is more preferably about 0.2 to about 0.5 moles per liter of co-polymer. The triiodide or tribromide content is preferably about one-third the content of pyridinium groups so that all of the iodide or bromide ion that is released upon reductive decomposition of triiodide or tribromide can be taken up by the polymeric medium. Triiodide is more preferred as compared to tribromide.

The polymeric medium is preferably a macroreticular chloromethylated styrene-divinylbenzene co-polymer that is reacted with pyridine or an appropriate mono- or disubstituted pyridine to form the corresponding pyridinium chloride, whose chloride ion is further exchanged with triiodide or tribromide ions. A preferred, contemplated polymeric medium is free of water-elutable iodine or bromine, and is present as free-flowing particles, although a contemplated polymeric medium can be present as a film.

In preferred practice, the $R^1$ group is hydrido and $R^2$ group is at the 4-position, and is preferably a H (hydrido) group. More preferably, both $R^1$ and $R^2$ are hydrido groups so pyridine itself is used. When either $R^1$ or $R^2$ is other than hydrido, that R group is preferably a methyl ($C_1$) group. Exemplary mono- and di-substituted pyridines where the substituent $R^1$ or $R^2$ group is a methyl ($C_1$) group include α-, β-, and γ-picolines, and the 3,4-, 3,5-, 2,3-, 2,4-, 2,5- and 2,6-lutidines.

A preferred process for preparing a contemplated ion exchange resin using pyridine itself or a mono- or di-$C_1$–$C_4$ alkyl pyridine [$R^1$=H or $C_1$–$C_4$ alkyl and $R^2$=H or $C_1$–$C_4$ alkyl] is illustrated generally in Synthesis Scheme 1 shown below.

Synthesis Scheme 1

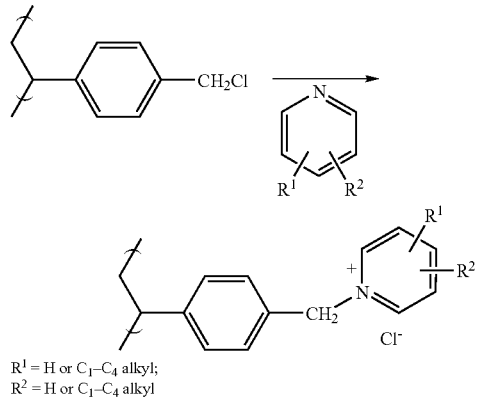

$R^1$ = H or $C_1$–$C_4$ alkyl;
$R^2$ = H or $C_1$–$C_4$ alkyl

As is seen, a preferred reaction sequence begins with the preparation of chloromethylated cross-linked polystyrene such as the beads whose synthesis is well-known from the preparation of commercially available quaternary ammonium ion-containing ion exchange resins. Generally spherical beads are a preferred form of a contemplated resin and such beads are utilized illustratively herein.

In one procedure, cross-linked polystyrene beads are first prepared that are subsequently chloromethylated by reaction with chloromethyl methyl ether in the presence of aluminum chloride or similar Friedel-Crafts catalyst. The resulting chloromethylated beads are thereafter reacted with pyridine or a substituted pyridine.

Another process co-polymerizes vinyl benzyl chloride (chloromethyl styrene) and a cross-linker in a manner similar to that used to prepare poly(styrene-co-chloromethylstyrene) resin beads containing 2 percent DVB cross-linker that are described by Tomoi et al. *J. Am. Chem. Soc.* 103:3821 (1981).

Exemplary cross-linked chloromethylated polystyrenes can be obtained from Sigma Chemical Co. of St. Louis, Mo. under the designation Merrifield's Peptide Resin. These beads are of 200–400 mesh size and are available at 0.9–1.5 milliequivalents (meq) of chloride per gram, 0.4–0.9 meq/g, both at 1% cross-link, and about 1 meq/g at 2% cross-link. Similar 200–400 mesh materials are also available from Acros Organics, Fisher Scientific, Pittsburgh, Pa. that are said to contain 2–2.5 meq/g chlorine at both 1% and 2% cross-link.

It should be apparent to those skilled in the art of water purification that a water-insoluble polymeric adsorption or oxidizing medium can be solid or liquid. It should also be understood that the N-pyridinium vinylbenzyl-containing moieties need not themselves form part of a polymer backbone, but can also be grafted onto a previously made polymer using usual grafting techniques for vinylbenzyl chloride, followed by reaction with a pyridine and triiodide or tribromide exchange to form an adsorption medium having N-pyridinium triiodide or tribromide moiety oxidation/adsorption sites.

Suitable cross-linking materials for use in the present invention include divinylbenzene (DVB), trimethylolpropane triacrylate, trimethylolpropane trimethacrylate, 1,6-hexanediol dimethacrylate, 1,10-decanediol dimethacrylate and the like as are well known in the art. Divinylbenzene is a particularly preferred cross-linking agent, and frequently contains ethyl styrene as an impurity. A person of ordinary skill in the art will appreciate that one can use other cross-linking materials without extending beyond the scope of the present invention.

Contemplated polymeric media in particulate form can be sized from about 400 mesh to about 10 mesh, as may be desired depending upon the flow rate of water through a column as is usually used in the preparation of aseptic water. Preferably, the particles are of about 20 to about 35 mesh (about 850 μm to about 500 μm), and more preferably about 25 to about 30 mesh, or about 710 to about 600 μm. The particle size distribution of an exemplary batch of polymeric medium is shown in Example 1, hereinafter.

Additionally, a contemplated polymeric medium in triiodide form is dark brown to brown-purple in color, whereas the tribromide form is a red-orange color. A co-polymer free of triiodide or tribromide ions such as a precursor or spent medium is tan so that one can tell by a color change when the polymeric medium is spent and should be replaced.

A contemplated adsorption medium is seemingly similar to the strong base trialkyl ammonium media described in the Lambert et al. U.S. Pat. No. 3,923,655, and also seemingly similar to the N-alkyl pyridinium group-containing media of the Smith et al. U.S. Pat. No. 5,908,557. However, in each instance, the medium contemplated here is not only different in structure from each of those other media, but also different in its binding characteristics for various ions.

Thus, as already noted, the media of both the Lambert et al. and Smith et al. patents contain N-alkyl quaternary ammonium moieties. Those groups can decompose to form halomethanes, which are believed to be carcinogenic. A medium contemplated here, with its pendent benzyl pyridinium group, cannot decompose similarly. Additionally, as shown in the Examples hereinafter, a medium as taught in Lambert et al. in the triiodide form loses iodine to its surroundings, whereas a contemplated medium does not. Furthermore, a contemplated medium and that disclosed in the Smith et al. patent, when both are in their chloride forms, bind dichromate ion at very different rates, even though the available binding sites were in great excess over the amount of dichromate present.

Another embodiment of the invention contemplates a process for forming an aseptic fluid such as water or air from a fluid containing microbial contamination. A contemplated process can be used with air as well as fresh or salt water in that elution of a previously discussed polymeric medium with 2 molar sodium chloride did not remove a noticeable amount of iodine.

One contemplated process comprises the steps of providing a vessel containing a water-insoluble polymeric oxidizing medium having a plurality of polymerized N-pyridinium vinylbenzyl triiodide or tribromide moieties (groups) of the structure

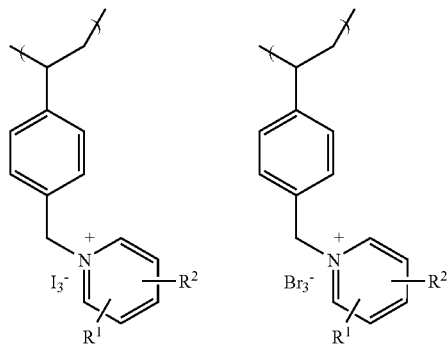

wherein $R^1$ and $R^2$ are independently a hydrido or a $C_1$–$C_4$ alkyl group.

An influent of microbially contaminated fluid such as water that is clear and free from visible precipitate is introduced to the vessel to contact the insoluble medium. Thus, for example, the water contemplated for use in this process has some microbial load, but is not a highly contaminated slime as might be found in a sewage treatment plant. Rather, water from a lake or river, ornamental pond or pond for the display of aquatic fish and crustaceans is contemplated for use in a process. The water can be slightly turbid and can be filtered prior to use in a process to remove the turbidity.

The fluid such as water is maintained in contact with the insoluble medium for a time period sufficient for microbes present in the influent to be killed by the triiodide or tribromide ions and form an aseptic fluid such as water. The aseptic fluid is discharged from the vessel as an effluent.

Exemplary microbes against which a contemplated process is useful include *Pseudomonas aeruginosa*, coliform such as *Klebsiella terrigena* and *E. coli*, *Cryptosporidium*, *Giardia muris* and *Giardia lamblia*, *Legionella* and the like. *Pseudomonas aeruginosa* and coliforms such as *E. coli* are particular microbes against which a contemplated polymeric medium is useful.

The before-noted preferences for the polymeric medium are maintained when that medium is used in a contemplated process.

An apparatus for preparing an aseptic fluid comprising the above polymeric medium in a support vessel is also contemplated. A contemplated support vessel is typically glass or plastic such as polyethylene or polypropylene and is typically a chromatographic column or cartridge. A contemplated vessel can include one or more inlets, outlets, valves such as stopcocks and similar appendages.

One contemplated support vessel is cylindrical and has an inlet for receiving a fluid such as an aqueous solution prior to contact of the solution with the contained polymeric medium and an outlet for the egress of water after contact with the medium. When the support vessel is a glass or plastic chromatographic column or cartridge, the vessel can contain appropriate valves such as stopcocks for controlling aqueous flow, as are well-known, as well as connection joints such as Luer fittings. The inlet for receiving an aqueous liquid solution and outlet for liquid egress can be the same structure as where a beaker, flask or other vessel is used for a contemplated process, but the inlet and outlet are typically different and are separated from each other when a fluid such as air is utilized. Usually, the inlet and outlet are at opposite ends of the apparatus.

FIG. 1 provides a schematic drawing of one preferred apparatus for preparing aseptic water. Here, the apparatus 10 is shown to include a support vessel as a column 12 having an inlet 26 and an outlet 28 for water. The outlet has an integral seal and is separable from the seal at a frangible connection 32. The apparatus 10 contains one or more flow-permitting support elements. In one embodiment, a frit 22 supports polymeric medium 16, and an upper frit 18 helps to keep the medium in place during the introduction of an influent of aqueous solution. Contemplated frits can be made of glass or plastic such as high density polyethylene (HDPE). A HDPE frit of 35–45 μm average pore size is preferred. A contemplated apparatus can also include a stopcock or other flow-regulating device (not shown) at, near or in conjunction with the outlet 28 to assist in regulating flow through the apparatus.

An above-described chromatographic column is typically offered for sale with a cap (not shown) placed into inlet 26 and snap-off (frangible) tube end 30. The polymeric medium in such a column is typically wet and equilibrated with aseptic water and can be used as part of a backpacker's kit for a hike or camping trip or the like for a person away from aseptic water. It is preferred that the average diameter of polymeric medium particles be about 600 to about 750 μm when a chromatographic column apparatus is prepared and used.

Figure 2:
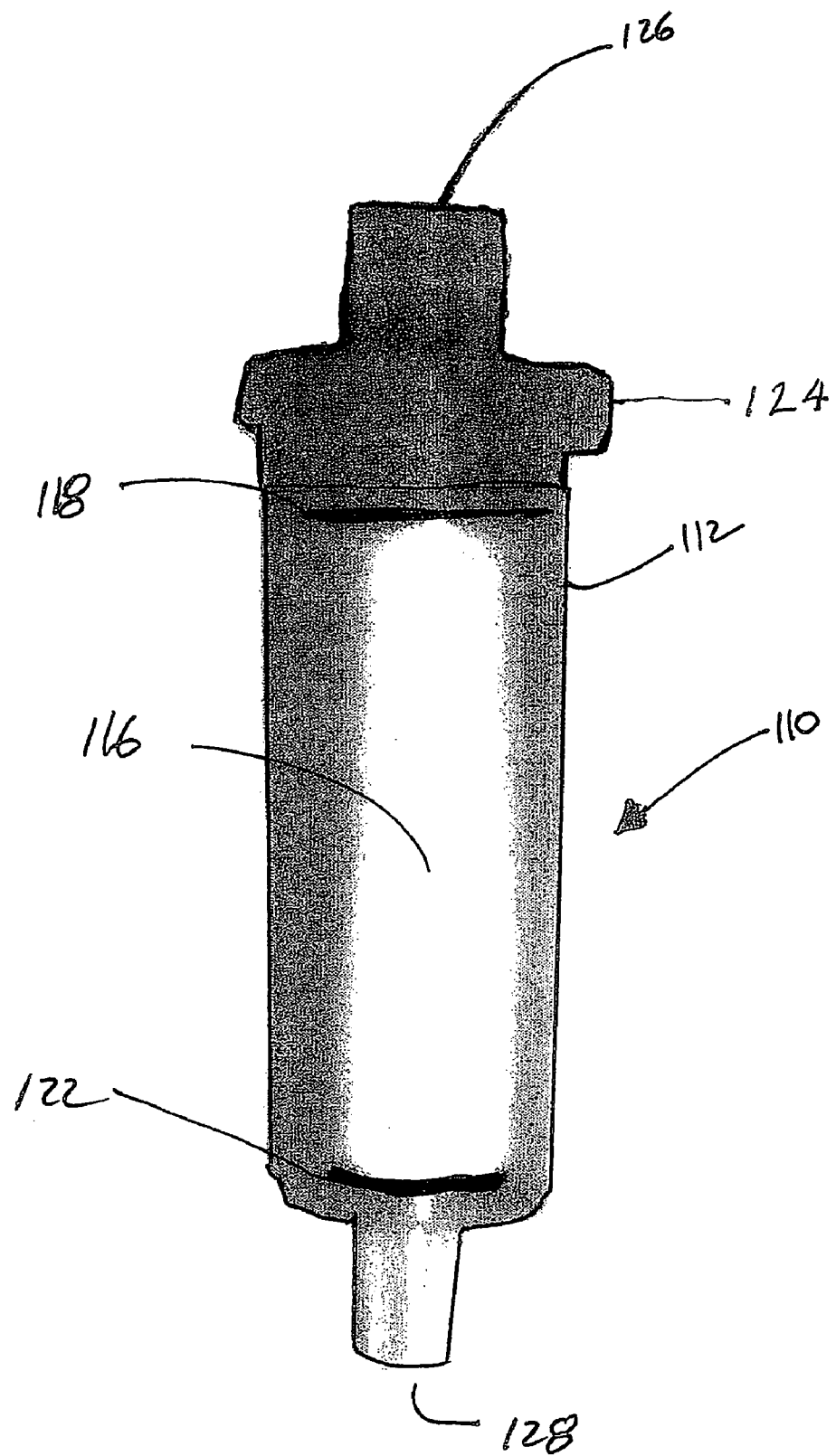
FIG. 2 shows a schematic representation of another separation vessel useful in an embodiment of the invention.

FIG. 2 provides a second schematic drawing of another preferred apparatus. Here, the apparatus 110 is shown to include a support vessel as a cartridge 112 having an inlet 126 and an outlet 128 for water. A cap 124 is preferably integrally molded with the inlet 126. The outlet 128 is preferably integrally molded with the cartridge 112. The apparatus 110 contains a porous support such as a frit 122 that supports polymeric medium 116. An upper porous support such as a frit 118 helps to keep the medium in place during the introduction of an influent aqueous sample or eluting solution. A contemplated apparatus can also include a stopcock or other flow-regulating device (not shown) at, near or in conjunction with the outlet 128 to assist in regulating flow through the apparatus.

A contemplated cartridge such as a vessel of FIG. 2 is typically provided with the polymeric oxidizing medium in a dry state, or wet with aseptic water. In addition, inlet 126 and outlet 128 are preferably standard fittings such as Luer fittings that are adapted for easy connection to other standard gas and/or liquid connections. This embodiment is particularly adapted for use in a person's sink as a final filter prior to use of the water, as where potable water is delivered from a well. This embodiment containing dry polymeric medium is also particularly adapted for use with air as the fluid. It is also preferred that the average diameter of particles be about 600 to about 750 μm when a cartridge apparatus is prepared and used.

Figure 3:
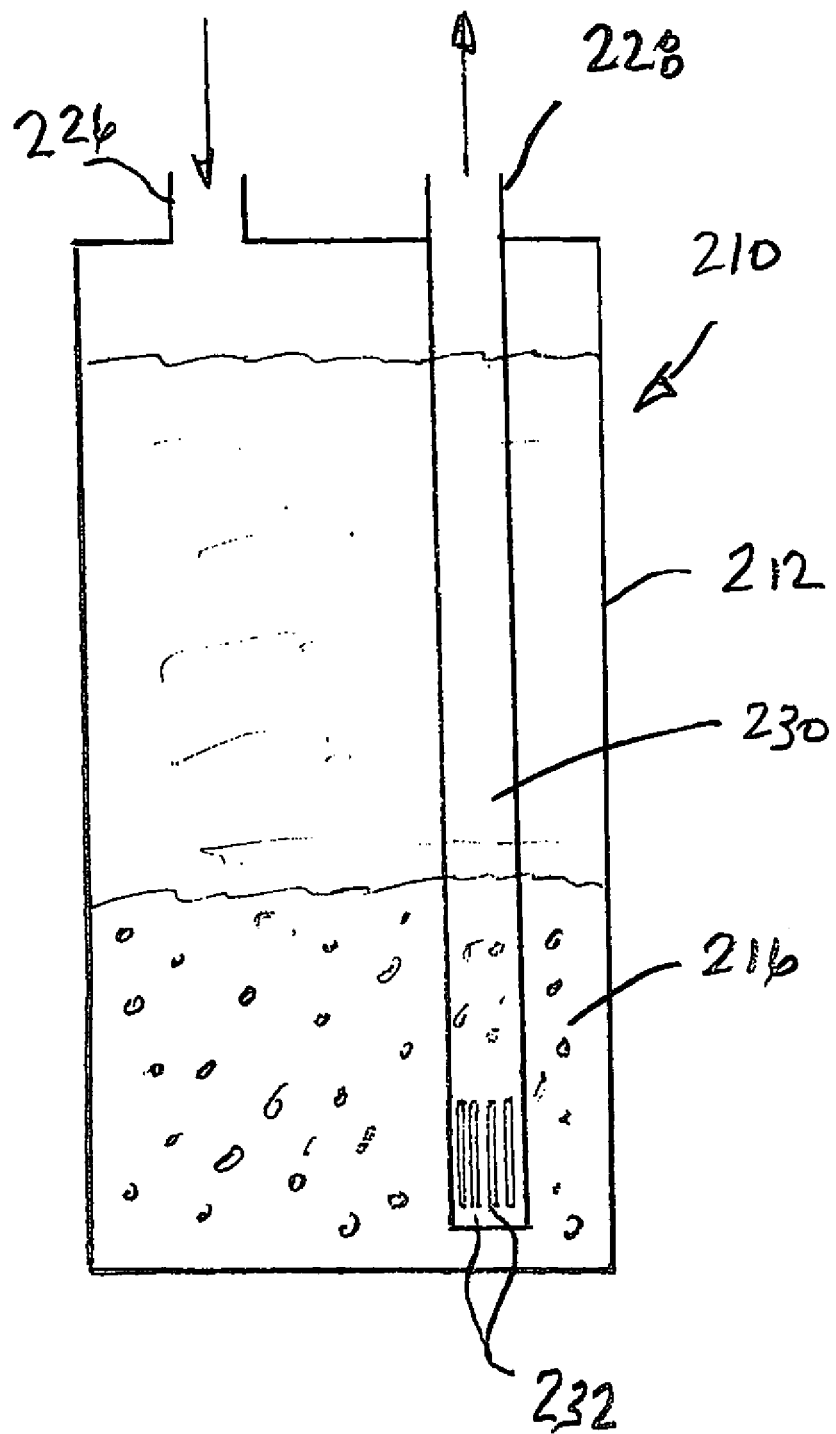
FIG. 3 shows a schematic representation of yet another separation vessel useful in an embodiment of the invention.

FIG. 3 illustrates a schematic diagram of yet another apparatus 210 for carrying out the present invention. The apparatus 210 includes a support vessel 212 having an inlet port 226 and an outlet port 228. The inlet and outlet ports 226, 228 are positioned on a common end of the vessel 212. This arrangement can be used where, for example, access to the entire vessel 212 is limited and attachment of connecting tubing (not shown) is facilitated by locating the ports 226, 228 near or adjacent one another.

The vessel 212 supports the polymeric oxidizing medium 216 therein to a predetermined height (corresponding to a volume) within the vessel 212. A dip pipe 230 is located within the vessel 212 in flow communication with the outlet port 228. The dip pipe 230 provides a path for discharging treated (e.g., aseptic) water from the vessel 212.

Slits 232 or other openings are formed in the dip pipe 230 to provide a flow path from the vessel 212 to the interior of the pipe 230 and thus the vessel outlet 228. The slits 232 or openings are sized accordingly to prevent the loss of media 216 from the vessel 212. As with the previously described embodiments, a support, such as frit (not shown) can be placed over the polymeric media 216 to maintain the media 216 in place in the vessel 212.

As will be readily understood from a study of FIG. 3, water is supplied to the vessel 212 through the inlet port 226. The water "fills" the vessel 212 to an operational level. Treated water is drawn from the outlet 228 through the dip pipe 230. The water flow through the dip pipe 230 can only enter the pipe by flowing through the media 216. Thus, a compact, readily connected apparatus 210 by which to treat water is provided.

One contemplated apparatus such as that of FIG. 1 can be readily prepared by slurrying the polymeric medium in aseptic water. The slurry is added onto a flow-permitting support element such as a frit in a vertically oriented support vessel such as a column. The medium is permitted to settle under the force of gravity and can be packed more densely using vibration, tapping or the like. Once a desired height of medium is achieved, any excess liquid is removed as by vacuum, a second flow-permitting element such as another frit is inserted into the column above the medium and the cap is added.

To prepare another chromatographic column that can be used for a contemplated process, a portion of polymeric medium prepared as discussed above is slurried in aseptic water and aliquots of that slurry are transferred under nitrogen pressure to a 10 cm long glass Bio-Rad® column (1.4 mm inside diameter) equipped with polypropylene fittings manufactured under the trademark "Cheminert" by Chromatronix, Inc., Berkeley, Calif. When the desired bed height is reached (corresponding to a bed volume of about 0.6 cm³), the medium is resettled by back-washing. The polymeric oxidizing medium is then rinsed with several bed volumes of aseptic.

An apparatus shown in FIG. 2 can be prepared by adding a predetermined weight of dry polymeric medium to the cartridge 112 containing molded outlet 128 and support frit 122. The thus filled cartridge is vibrated in a vertical orientation to achieve a constant height for the medium bed, the upper porous support 118 is inserted, and the cap 124 containing molded fluid inlet 126 is placed onto the device.

The present invention is also directed to a process for oxidizing trivalent arsenic to pentavalent arsenic and removing objectionable levels of arsenic from an aqueous solution also containing other ions. Typically, in order to reduce the arsenic concentration of drinking water to acceptable levels, the arsenic MCL should be at or below 50 parts per billion (ppb), preferably at or below 10 ppb, and most preferably at or below 2 ppb.

A process for oxidizing trivalent arsenic ions in solution to pentavalent arsenic ions is thus contemplated. In accordance with such a process, a vessel, also referred to as a flow-permissive container such as a before described chromatographic column or mesh pouch is provided that contains a water-insoluble polymeric oxidation medium having a plurality of oxidation sites that are polymerized N-pyridinium vinylbenzyl triiodide or tribromide moieties (groups) of the structure

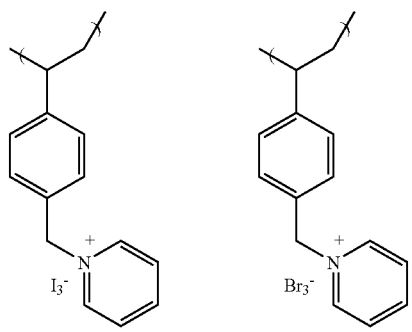

wherein $R^1$ and $R^2$ are independently a hydrido or a $C_1$–$C_4$ alkyl group.

A volume of an influent aqueous pre-sample solution that can contain arsenic as water-soluble ions in the trivalent form at a concentration greater than about 2 parts per billion is introduced as an influent into the vessel to contact the insoluble oxidizing medium. This solution is also referred to herein as a load or challenge solution. That influent introduction can be carried out by pumping, gravity flow, or simple diffusion as is well known.

The pre-sample solution is maintained in contact with the insoluble oxidizing medium for a time period sufficient for trivalent arsenic present in the influent to react with the oxidizing sites to oxidize to pentavalent arsenic to form a sample solution and a reduced medium. The sample solution is then discharged from the vessel as an effluent of pentavalent arsenic ions.

The influent arsenic-containing aqueous solution is typically provided from a ground or surface water source, such as a well. In a preferred process, the aqueous solution has an initial trivalent arsenic concentration of more than about 10 parts per billion.

In preferred embodiments, the trivalent arsenic oxidation is coupled to removal of the pentavalent arsenic that is formed so that a process for removing or reducing the concentration of trivalent and pentavalent arsenic in an arsenic-containing solution is contemplated. Thus, in one embodiment, the effluent from the oxidation is contacted with a pentavalent arsenic binding medium such as conventional strong base anion exchange resin that binds pentavalent arsenic and that contact is maintained for a time period sufficient for the pentavalent arsenic to bind to the ion exchange resin and formed pentavalent arsenic bound resin and an aqueous composition. Other pentavalent arsenic binding media include manganese silicate, alumina, alumina/iron oxide physical mixtures and iron oxide deposited on alumina.

The oxidizing medium can be mixed together with another pentavalent binding medium, thereby forming a mixed-bed medium capable of oxidizing trivalent arsenic and binding pentavalent arsenic. The maintenance times for oxidation and binding to the binding medium can be the substantially same when the two materials are physically mixed in the same vessel in that sorption of pentavalent arsenic from the sample solution occurs substantially as the oxidized ions are formed, so that those times are not differentiated during usage. The maintenance times for both steps are typically very similar even when the oxidation medium and binding medium are in physically separated vessels.

The aqueous composition is then discharged from the ion exchange resin-containing vessel as an effluent having final arsenic concentration of about zero to about 2 parts per billion.

The pentavalent arsenic binds poorly to the quaternized N-pyridinium vinylbenzyl groups present in the oxidizing medium. This finding is quite the contrary to the findings reported in U.S. Pat. No. 5,908,557 in which the N-alkyl pyridinium groups bound well to formed pentavalent arsenic ions, and those N-alkyl pyridinium groups could be used to remove the formed pentavalent arsenic from the aqueous solution. This difference in binding was unexpected, but was found useful in that pentavalent arsenic (arsenate) ions do not apparently displace triiodide or tribromide counter ions to the N-pyridinium vinylbenzyl groups, thereby maintaining the oxidative capacity of the medium.

Preferably, the pentavalent arsenic binding medium and oxidizing medium are provided so that contact with the influent occurs in a serial manner such that fresh pentavalent arsenic binding medium is provided to the aqueous composition "downstream" of the oxidation medium in the same or a second vessel. The oxidizing medium and adsorption medium can be provided in the same vessel in unmixed, separate layers, for example such that the influent solution first encounters the oxidizing medium, followed by the adsorption medium. Alternatively, after contacting the oxidizing medium, the aqueous composition containing pentavalent arsenic can be introduced into a second vessel containing adsorption medium.

The arsenic-containing aqueous solution is typically provided from a ground or surface water source, such as a well. In a preferred process, the aqueous solution has an initial trivalent and pentavalent arsenic concentration of more than about 50 parts per billion.

A contemplated triiodide-reacted or tribromide-reacted insoluble oxidizing medium is dark brown or red-orange in color, respectively. Upon contact of the colored insoluble oxidant with trivalent arsenic-containing aqueous streams, the characteristic dark brown or red-orange color is discharged, yielding a light tan medium that is the color of starting polymerized N-pyridinium vinylbenzyl medium. Thus, conversion of trivalent arsenic to pentavalent arsenic by a contemplated insoluble oxidizing medium of this invention is a self-indicating process.

In preferred practice, it is contemplated that contact between the arsenic-containing aqueous solution and the oxidizing medium be carried out in a chromatographic column or flow-through container, such as a perforated plastic or mesh pouch containing adsorption particles, e.g., a "tea bag". A glass or plastic (e.g. polyethylene or polypropylene) column is a particularly preferred vessel for use herein and has an inlet for receiving an aqueous sample solution prior to contact of the sample solution with a medium and an outlet for the egress of water after contact with the medium. In such use, the media are preferably in the form of solid beads or particles. It is noted, however, that another physical form such as a liquid, powder, membrane, sheet or other web can also be utilized.

Contact between the pentavalent arsenic binding medium and the aqueous pentavalent arsenic-containing sample solution is maintained for a time period sufficient for the pentavalent arsenic to be bound by the medium. That binding is usually quite rapid, with contact times of a few seconds to a few minutes typically being utilized. Much longer contact times such as a few hours can be utilized with no ill effect being observed.

Contact between the oxidizing medium and the aqueous trivalent arsenic-containing solution is maintained for a time period sufficient for the triiodide to oxidize the trivalent arsenic to pentavalent arsenic. The reaction is rapid. Use of an oxidizing medium comprised of polymerized N-pyridinium vinylbenzyl triiodide or tribromide moieties permits the arsenic oxidation to be conveniently monitored by observation of the color change from the dark brown color of the triiodide or red-orange tribromide complex to the light tan color of the reduced N-pyridinium vinylbenzyl oxidizing medium.

The contact time is conveniently controlled by changing the flow rate through the column or flow-permissive container. The time that the solution is maintained in contact with the adsorption or oxidizing medium is the "solution residence time".

The flow, temperature and pressure constraints of the process are dictated primarily by the limitations of the equipment utilized and the resin used in carrying out the invention. Ambient temperature and pressure are normally used.

A contemplated trivalent arsenic oxidizing process successfully oxidizes trivalent arsenic in arsenic-contaminated aqueous solutions at temperatures between about 15° C. and 90° C. Preferably, the process is operated at temperatures between about 20° C. and 70° C.

The present trivalent arsenic oxidation process successfully provides aqueous pentavalent arsenic at a pH value from acidic to about neutral (about pH 1 to about pH 7). Preferably, the process is operated with a solution having a pH value between about 4 and 7, and most preferably, between about 6 and 7. At pH values above about 7, the process begins to lose efficiency.

A more general process for oxidizing a water-soluble metal ion from a first oxidation state to a second, higher oxidation state is also contemplated. This process comprises the following steps.

a) A vessel, as discussed before, is provided that contains a solid water-insoluble polymeric oxidizing medium having a plurality of oxidizing sites that are N-pyridinium vinylbenzyl triiodide or tribromide moieties as discussed previously.

b) A volume of an influent aqueous solution that contains metal ions of a first oxidation state as water-soluble ions is introduced into the vessel to contact the insoluble oxidizing medium to form a solid/liquid admixture.

c) The solid/liquid admixture is maintained for a time period sufficient for the metal ions present in the influent to react with the oxidizing sites to oxidize to a second, higher oxidation state to form a sample solution and a reduced medium.

d) The sample solution is then separated from the reduced medium.

Exemplary metal ions that can be so oxidized include iron, manganese, arsenic, antimony, mercury and chromium.

In some instances, the oxidized metal ions remain in solution, whereas in others, the oxidized metal ions bind to the oxidizing medium and form medium-bound metal ions. In the former instance, as with iron and arsenic ions, the solid and liquid phases need only be physically separated to separate the sample solution from the reduced medium. In other instances, the sample solution is separated from the reduced medium by contacting the reduced medium with a stripping solution comprised of an aqueous salt solution.

Another aspect of the invention contemplates modified particulate alumina containing meta-periodate ions substantially homogeneously sorbed throughout the particles. The particles are often referred to herein as A/P particles. The meta-periodate ions are present in an amount of about 0.1 to about 0.15 molar in a gravity-settled volume of particles in deionized water. Sodium or potassium cations are the preferred counterions for the periodate ions. A lesser amount of meta-periodate anions can be present, but use of such an amount can be wasteful.

These A/P particles are useful as intermediates in forming the iron- or manganese-containing particles discussed below. These particles are also useful in removing manganese, iron, cobalt and mercury ions from aqueous compositions, which ions can be in a lower -ous or higher -ic oxidation state, such as ferrous or ferric, manganous or manganic, mercurous or mercuric of cobaltous or cobaltic ions. These A/P particles are also useful for removing harmful bacteria such as coliforms from water. In dried form, A/P particles can be used in an air filter.

A further aspect of the invention contemplates modified alumina particles containing iron (A/I particles) or manganese (A/M particles) or both substantially homogeneously sorbed throughout the particles. The iron or manganese is present in an amount of about 0.05 to about 0.15 molar in a gravity-settled volume of particles in deionized water. When iron is present in the absence of manganese, the iron concentration is preferably 0.1 to about 0.15 molar. When manganese is present in the absence of iron, the manganese is present in an amount of about 0.50 to about 0.075 molar. When both are present, the amount of iron and the amount of manganese typically is determined from the feed proportion, with the understanding that manganese requires two electrons per atom whereas iron requires only one for oxidation. The particles contain an oxidized iodine species and are substantially free of molecular iodine.

A process for removing arsenic or antimony +3 or +5 ions from a water supply is also contemplated. That process comprises the following steps.

a) An aqueous solution that contains arsenic or antimony +3 or +5 ions in a concentration greater than about 2 parts per billion is contacted with modified alumina particles. That solution can contain one through all four of those ions ($Sb^{+3}$, $Sb^{+5}$, $As^{+3}$ and $As^{+5}$). Those modified alumina particles contain iron or manganese or both sorbed substantially homogeneously distributed throughout in an amount of about 0.05 to about 0.15 molar as measured in a gravity-settled volume of particles in deionized water. The particles also contain an oxidized iodine species and are substantially free of molecular iodine.

b) That contact is maintained for a time period sufficient for arsenic or antimony +3 or +5 ions present to be sorbed by the particles to form arsenic- or antimony-containing particles and an aqueous solution having a lessened amount of arsenic or antimony. The contact can be at a flow rate of about one bed volume (b/v) per minute, or slower.

c) The arsenic- or antimony-containing particles are separated from the aqueous solution having a lessened amount of arsenic or antimony. That separation can be by the simple procedure of passage of the aqueous solution through a column of the alumina particles. The particles and aqueous solution can also be separated by centrifugation, filtration and the like that are well-known to skilled workers.

In some preferred embodiments, water from which the ions are to be removed is first passed through a bed of a before-described water-insoluble polymeric oxidizing medium to convert the +3 ions into +5 ions that can be more readily sorbed by the alumina particles. The water-insoluble polymeric oxidizing medium is preferably retained within a column as are the alumina particles.

EXAMPLES

Example 1

Preparation of a Polymeric Medium

One process for preparing the 2 percent DVB cross-linked resin includes mixing gelatin (about 1.35 grams), poly (diallyldimethylammonium chloride) (about 12.3 grams), boric acid (about 5.1 grams), and water (about 450 grams) in a flask. The mixture is adjusted to a pH of approximately 10.0 with 25 percent aqueous sodium hydroxide.

A solution of styrene (about 214 grams), chloromethylstyrene (about 75 grams), technical grade 55 percent divinylbenzene (about 10.9 grams), and azobisisobutyronitrile (about 1.5 grams) is then added to the flask. The material in the flask is heated to a temperature of about 70° C., continuously stirred, and maintained under a nitrogen purge for approximately 17 hours during which time cross-linking occurs. Cross-linking causes generally spherical shaped droplets to form. Polymerized spheres are then removed from the mixture. The chloromethylated co-polymer is soaked at room temperature in a solution of 10 volume percent pyridine in water until titration indicates that greater than 90% of the chloromethyl groups are consumed.

In another process, a benzyl pyridinium chloride co-polymer was obtained from the Purolite Company of Bala Cynwyd, PA under the designation A-560. This material is water-insoluble, generally spherical in shape and macroreticular. This material has a stated capacity of 1 meq/mL of chloride and a moisture content of about 59.7 percent. The particle size distribution shown is in the Table below.

| Particle Size Distribution | |
| --- | --- |
| Diameter (microns) | Percentage |
| <300 | Zero |
| <425 | 0.8 |
| <500 | 6.5 |
| <630 | 95.6 |
| <710 | 97.5 |

Median Diameter = 568 microns

One liter of the above benzyl pyridinium resin was slurried with 1.0–2.0 liters of deionized water in a glass 4 L beaker equipped with an overhead stirrer. With rapid stirring, 500 mL of a 0.5 N $KI_3$ solution was added in a steady stream (over about 10–15 seconds) at room temperature to the water/resin slurry. Within about 1–5 minutes, the dark brown $KI_3$ solution became colorless and the light tan resin particles became the brown polymeric medium contemplated herein. The polymeric medium particles are typically filtered and rinsed with deionized water to remove the potassium chloride that is formed. The resulting polymeric medium contains about 0.25 moles of $I_3^-$ per liter.

In another preparation, a batch of the A-560 resin was stirred by an overhead paddle stirrer in a 2 liters of 1.0 M NaBr in water for a time period of 30 minutes at ambient room temperature to form a suspension. Liquid bromine (80 g; 0.5 moles) was added to the stirring suspension in a steady stream over a 2–3 minute time period, with the stirring continuing for about an additional 5 minutes after the addition was complete. The $Br_3^-$ ion-containing resin was a bright orange-red color and the supernatant was colorless. The resin was filtered, washed with 8–10 liters of fresh deionized water and air-dried at room temperature until free flowing. No odor of bromine was noted from the resulting dried tribromide resin.

Example 2

Iodine Elution

Two studies were carried out to assess the ease with which iodine could be eluted from a contemplated polymeric medium. In the first study, a strong base anion exchange resin in triiodide form denominated A-605 available from Purolite Company, Bala Cynwyd, Pa. was compared to a contemplated polymeric medium. The A-605 resin was said to be a styrene divinylbenzene gel resin having a wet screen size of about 16 to about 50. The contemplated polymeric medium was a chloromethylated styrene divinylbenzene that was reacted with pyridine, and the chloride present was exchanged for triiodide to provide about 0.2 moles of triiodide per kilo.

In the first study, using the procedure of PSTM-95 (Product Standard Test Method-95) that involved eluting a sample of the assayed material with sodium hydroxide and back titration of an aliquot with sodium thiosulfate showed that the A-605 contained 12 grams of iodine per 25 mL of resin, whereas no iodine was found by this procedure using the contemplated polymeric medium.

In a second study, a sample of the A-605 resin or another sample of the before-described polymeric oxidative medium in triiodide form was eluted with dechlorinated Philadelphia city water at a rate of 10 bed volumes (bv) per minute. Portions of the eluent were collected at 50, 100 and 150 bed volumes and analyzed for free iodine using the leuco crystal violet method of the AWWA "Standard Methods for the Examination of Water and Waste Water" 20$^{th}$ edition (American Water Works Association, 6666 West Quincy Ave., Denver Colo. 80235). Iodide ion was also assayed for, but those data obtained are suspect and are not reported here. The results are shown in the Table below.

| Iodine Water Elution Study | |
|---|---|
| SAMPLE | FREE $I_2$ (mg/L) |
| A-605 | |
| 50 bv | 2.2 |
| 100 bv | 2.2 |
| 150 bv | 2.2 |
| Polymeric Medium | |
| 50 bv | 0.03 |
| 100 bv | 0.04 |
| 150 bv | 0.04 |

As is seen from the data, the A-605 resin lost iodine at a considerable and substantially constant rate over the course of the study, whereas a contemplated polymeric oxidative medium lost substantially nothing over that same course of study.

In a positive control study, a small portion of each material assayed above was contacted with 0.1 N sodium thiosulfate for about 18 hours (over night). On mixing, each material immediately turned from a dark purple color to tan. An aliquot of each supernatant liquor was removed and titrated with 0.01 N iodine to the starch end point. The results showed that the A-605 resin contained 12 grams of iodine/25 mL resin, whereas the contemplated polymeric medium contained 1.4 grams of iodine per 25 mL of resin.

Example 3

Preparation of Aseptic Water

A 40 gallon water tank used for recirculating water for a decorative pool was connected in a closed system to a column containing 300 mL of a contemplated polymeric medium supported on a porous frit. A pump maintained a flow rate of 450 mL per minute through the column of polymeric medium.

One hundred milliliter aliquot samples were taken from the tank on Aug. 23, 2000 and again on Oct. 25, 2000. Each of the samples was assayed by G&L Laboratories of Quincy, Mass. for *Pseudomonas aeruginosa* and *Legionella* present in each of the aliquots using colony-forming standard assay procedures. The results of that study are shown in the Microbial Assay Table below.

| Microbial Assay | | |
|---|---|---|
| Microbe | Colonies on Aug. 23, 2000 | Colonies on Oct. 25, 2000 |
| *Pseudomonas aeruginosa* | 140 | 3 |
| *Legionella* | <2 | <1 |

As can be readily seen, a contemplated polymeric medium was particularly useful in reducing the load of *Pseudomonas aeruginosa* in the water tank.

Example 4

Coliform Removal

Several liters of water from the Rock River were obtained from downstream of the sewerage treatment plant in Rockford, Ill. Approximately one liter of that water was decanted and contacted with and eluted through about 20 mL of a triiodide form of the polymeric medium as described in Example 1 supported on a porous frit in a column at a flow rate of about one-half bed volume (about 10 mL) per minute. About one hundred mL from the pooled eluate were assayed for coliform and *E. coli* using commercial coliform and *E. coli* presence/absence assay kits (Hach Co., Loveland, Colo. Catalogue No. 23232 and No. 24016) following the kit instructions. The assays of the eluate were negative for the presence of coliform and *E. coli* after an extended incubation period, whereas a similar assay carried out on the original sample of Rock River water as a control was positive for coliform and *E. coli* after only a few hours of incubation. The polymeric medium-treated water also changed color from yellow to colorless.

Example 5

Arsenic Oxidation and Removal

Oxidation of arsenic from the trivalent to the pentavalent form is required when using a variety of conventional technologies for arsenic removal such as reverse osmosis and conventional anion exchange resins, neither of which recognize trivalent arsenic. The following studies were carried out to illustrate the oxidation properties of a N-pyridinium vinylbenzyl triiodide group-containing oxidation medium disclosed herein.

A challenge solution comprised of one liter of tap water spiked to provide a trivalent arsenic concentration of 500 ppb. The pH value of the arsenic-containing tap water composition was adjusted to 6.8–7.0.

To a 50 mL burette with a stopcock and polyglass frit were added 5 mL of a before-described N-pyridinium vinylbenzyl triiodide group-containing oxidation medium that provided about 0.1 M triiodide to form Column A. A similar column, Column B, was prepared using 5 mL of a Type II strong base anion exchange resin. The latter resin is understood to be a co-polymer of styrene and divinylbenzene that is chloromethylated and then reacted with (2-hydroxyethyl)-dimethylamine, and is available from Sybron Chemicals Inc. under the designation ASB-2. Columns A and B were packed using tap water. The effluent from the column packing was concentrated 20-fold and tested for the presence of arsenic using a commercially available colorimetric Gutzeit Arsine Generation test [EM Science (Merck)] that is able to detect 100 ppb to 3000 ppb arsenic. The results were negative.

Procedure 1

Ten bed volumes (bv; 50 mL) of the challenge solution containing 500 ppb of trivalent arsenic were passed through the bed of Column B at a flow rate of 1 bv per minute and collected. The effluent tested at 500 ppb.

Procedure 2

Ten bv of the challenge solution containing 500 ppb of trivalent arsenic were passed through the bed of Column A at a flow rate of 1 bv per minute and collected. The collected effluent was then passed through the bed of Column B at the same flow rate and collected. The effluent from Column B was concentrated and assayed for total arsenic with a result of there being less than 5 ppb present.

Procedure 3

Procedure 2 was repeated except that the flow rate through Column A was increased to 2 bv per minute. The assay for arsenic after passage through Column B and concentration was again less than 5 ppb.

Procedure 4

Procedure 2 was again repeated except that the flow rate through Column A was increased to 3 bv per minute. The result was again the same.

The above results illustrate that a contemplated N-pyridinium vinylbenzyl triiodide group-containing oxidation medium could oxidize the challenged amount of trivalent arsenic and convert it to the pentavalent form that could be removed from the flow stream by a conventional anion exchange resin.

A similar, more qualitative, result was also obtained using well water from the area around Lake Winnebego in Wisconsin, near the city of Oshkosh. Here, the well water contained about 60 to about 120 ppb total arsenic and about 5–10 ppm iron. The arsenic was separately shown to be about 60–70 percent trivalent.

Approximately 74,000 gallons of well water for a home were passed through a commercially available iron removal system and thereafter through about ⅔ cubic foot of a before-described N-pyridinium vinylbenzyl triiodide group-containing oxidation medium containing about 0.2 M triiodide. The effluent water from the oxidation medium then passed through an iron oxide on alumina sorbent column to remove pentavalent arsenic and then into the home.

The iron oxide on alumina sorbent was prepared as discussed below. A laboratory of the State of Wisconsin found no detectable arsenic on assay of the effluent water after removal of pentavalent arsenic, with a limit of detection of 0.8 ppb. Those assay results also indicated no detectable iron with a detection limit of 0.01 to 0.02 ppm. These results also show that the kinetics of oxidation are relatively rapid.

The iron oxide on alumina sorbent was prepared as follows. Ten liters of 0.125 M sodium metaperiodate ($NaIO_4$)) were prepared in deionized water to which a few drops of sulfuric acid were added. The solution was placed into a 5 gallon plastic carboy. Alumina ($Al_2O_3$), 28–48 mesh, (Alcan AA400G) was scooped into the carboy until the solid reached the original 10 L volume, so that the container held about 12–14 L. The carboy was closed and rolled on a drum roller for a period of about 2 to 3 hours. Samples were taken from time to time from the supernatant and tested with starch iodide paper to test for free metaperiodate.

Once the supernatant was free of metaperiodate, the mixture was filtered under reduced pressure through a Buchner funnel using plastic window screen as the filter. The filter cake was rinsed with deionized water and then dewatered with the aspirator.

The filtered metaperiodate-treated alumina was added back to the carboy and 10 L of 0.125 M ferrous ammonium sulfate $\{Fe[(NH_4)SO_4]_2\}$ were admixed with the metaperiodate-treated alumina. The carboy was closed and the contents mixed by rolling for about 12–16 hours (over night). The surface of the alumina became dark brown in color from the white original color, and after the mixing period, the supernatant liquid tested negative for iron using a commercial test paper with a sensitivity of about 100 ppm. The iron oxide on alumina sorbent so prepared was filtered and used as described above.

Example 6

Comparative Dichromate Binding

A qualitative study was conducted of relative rates at which dichromate ion is bound by an adsorption medium contemplated herein and an adsorption medium disclosed in Smith et al. U.S. Pat. No. 5,908,557. An adsorption medium contemplated here contains pendent benzyl pyridinium groups, whereas an adsorption medium of Smith et al. contains pendent N-alkyl pyridinium groups.

In a first study, a 20 mL capacity chromatography column equipped with a porous frit was charged with 15 mL of PERFIX™ resin (chloride form) of Smith et al. slurried in water. This adsorption medium contains about 2 equivalents per liter (eq/L) of quaternary groups. The column was permitted to flow at a rate of 10 mL per minute and was challenged with about 10 mL of an aqueous solution containing 1000 ppm of sodium dichromate (1 g/L) at a pH value of 7. A sharp yellow-orange band of bound formed immediately at to top of the column, indicating rapid take-up of the challenge.

A similar study was carried out with an adsorption medium contemplated herein using the same amount of medium, also in chloride form, at the same flow rate. Repeating the above challenge with the sodium dichromate solution at the same flow rate provided a vertically diffuse yellow-orange band with some breakthrough of dichromate. Incubation for several hours resulted in complete take up of the dichromate ions.

These results indicate that there is a major difference in binding rate between the two adsorption media towards dichromate ion. Thus, even though there were more than enough binding sites available in each medium, one medium bound the dichromate ions almost instantly, whereas the other took several hours to bind the dichromate ions. On the other hand, both materials appeared to adsorb triiodide ions at about the same rate.

Example 7

Preparation of a Further Alumina/Meta-periodate Complex

To a 12 gallon plastic graduated carboy (Nalgene Corp.) was added 30 liters of deionized water to which 1–2 mL of concentrated sulfuric acid was added. To the dilute acid solution, 800 cm$^3$ of solid, sodium metaperiodate was added. The periodate was dissolved by means of an overhead paddle stirrer. Solution was achieved in about 30 minutes at room temperature. The addition of sulfuric acid hastens the solution of meta-periodate salt but is not essential.

After solution was achieved, the stirrer was removed and solid, dry, activated alumina 28/48 mesh was scooped into the carboy with the aid of a wide-mouth funnel until the alumina level in the carboy was equal to the 30 liter mark (approximately 23 kg dry weight). The carboy cap was replaced and the carboy and contents, about 38 liters total reaction volume, was placed on its side and rolled periodically by means of a mechanical drum roller or by manually rolling the carboy across a flat surface such as a floor. Rolling was best accomplished in 2–3 minute intervals to insure good mixing but avoiding conditions that promoted particle size reduction through milling.

After 4–5 rolling cycles, the carboy was placed upright and allowed to remain undisturbed overnight. At the end of this period, fines associated with the raw material alumina had settled leaving a clean, light yellow supernatant that tested negative for meta-periodate ion using starch/KI indicator solution. This indicated that all of the meta-periodate had bound to the alumina particles.

The meta-periodate-loaded alumina particles were removed from the carboy by pouring and sluicing by means of a water stream. Alumina/periodate particles were collected on a horizontal plate filter equipped with a window screen mat that permitted fines to pass through. The collected particles were washed with tap water until the effluent stream from the filter pot was relatively free of fines. Washes containing fines were collected in appropriately sized vessels or jugs allowing fines to settle prior to discarding the wash water mixed with reaction supernatant.

Alumina/periodate particles remaining on the filter screen are further de-watered by applying a water aspirator vacuum to the filter. Alumina/periodate (A/P) can be used directly at this point for preparation of alumina/iron complex or alumina/manganese complex. (See Examples 2 & 3) Alternatively, the de-watered alumina/periodate particles can be further dried (until free flowing) by loading in trays and air open- or oven-dried. The oxidation ability of dried A/P was retained over at least several months as ascertained by challenging with aqueous manganous (Mn II) or ferrous (Fe II) ions that result in characteristic colors formed within and upon the white A/P.

The scale of A/P production is easily modified by following the protocol of this example. For instance, batches of A/P 10-times larger than described here have been processed substituting a rotary cone vessel for the carboy and a centrifuge equipped with window screens for the horizontal plate filter. Additionally, activated alumina of different mesh size or shape; i.e., spherical, can be processed as in this example with essentially the same results.

Example 8

Preparation of Alumina/Iron (A/I) Complex

Thirty liters of alumina/periodate (A/P) prepared in Example 7 were placed in an empty, 12 gallon plastic carboy along with sufficient room temperature de-ionized water to just cover the A/P particles. Next, a solution of ferrous ammonium sulfate was added to the carboy prepared by dissolving 3.7 moles of the above salt (1.47 kg of monohydrate, mw 392) in about 2.5–3 gallons (about 10 liters) of room temperature de-ionized water.

The capped carboy's contents were mixed immediately by placing the carboy on its side and rolling on a flat surface or a mechanical drum roller. Mixing by rolling is continued at 1–2 minute intervals for 1–2 hours. After this time period, a test for ferrous ion remaining in the reaction supernatant is negative. Test strips for iron (II) from EM Science (Gibbstown, N.J. 08027) sensitive to 10 ppm are convenient for monitoring iron uptake by the A/P. The uptake of iron ion by the A/P particles was rapid and can be noted visually by the immediate change in color of the white A/P particles to a dark, rust-brown color of alumina/iron (A/I) particles upon adding and mixing the solution of ferrous ions to the A/P in the carboy.

The resulting A/I particles were filtered, washed and dried per the procedure described in Example 7. As described in Example 7, the protocol described here for production of A/I is effective for smaller or larger batch sizes or for different mesh sizes and shapes of A/P. Dried or wet A/I is stable indefinitely and does not bleed iron or aluminum when challenged with an aqueous flow in a pH value of about 5.5 to about 8.5.

A/I particles prepared by this example and elsewhere herein are readily distinguishable from iron-alumina composites described by PCT WO 99/50182. The PCT application describes and claims a "coating" of insoluble ferric oxide formed by precipitation of iron (III) hydroxide onto the alumina carriers. This coating process results in a heterogeneous particle having a "salt and pepper" appearance and an unknown impact on the native, porous structure of the alumina carrier. A/I particles prepared by this example have a homogeneous appearance from particle to particle and throughout the entire volume and mass of each individual particle. A/I particles prepared herein are believed to have iron grafted onto and into the alumina matrix through an unknown structure mediated by the meta-periodate-alumina complex prepared in Example 7.

It was surprising that meta-periodate bound to alumina serves both as an oxidant and complexing agent to the challenging ferrous ions. A/I prepared by this method when re-challenged with fresh ferrous ammonium sulfate solution slowly liberates free, elemental iodine ($I_2$) as evidenced by iodine crystals forming and purple color in the vapor phase. A positive starch test was also observed.

A/I particles prepared by this example thus have residual meta-periodate ion (or similar oxidant) in some form as an integral component. A/I particles are a substantially homogeneous composition of iron in an unknown bonding state, an oxide of iodine and alumina. WO 99/50182 describes a composite of iron oxide carried as a coating on alumina.

Example 9

Preparation of Alumina/Manganese Complex

Manganous sulfate tetrahydrate ($MnSO_4.4H_2O$; MWt 223; 836 g) was dissolved in approximately 10 liters of deionized water at room temperature, was added to 30 liters of A/P (Example 7) in a 12 gallon plastic carboy and mixed by periodic rolling in a manner described in Examples 7 or 8. The resulting uniformly black particles of alumina/manganese (A/M) were filtered, washed and dried in an analogous manner to that described for the preparation of A/I given in Example 8. A/M particles are a dark-brown (black when wet) complex of alumina, an oxide of iodine and an oxide of manganese, probably $Mn^{+4}$. A/M was found to be stable indefinitely.

Example 10

Use of A/P to Mitigate Naturally Iron and Manganese in Potable Water

In Examples 9 and 8 above, ferrous or manganous ions were intentionally added to A/P particles to produce the derivatives A/I and A/M, which have utility for mitigation of arsenic and antimony from water. Ground water intended for potable use is frequently contaminated with indigenous $Fe^{+2}$ and/or $Mn^{+2}$. Although not posing a health hazard, indigenous iron and manganese can cause staining of clothing or manifest themselves as unsightly precipitates in packaged bottle water. Iron and manganese impurities are known to foul reverse osmosis membranes.

A 2 liter capacity plastic cartridge with top and bottom porous frits was loaded with approximately 2 liters of A/P matrix, plumbed and mounted vertically on the hot-water intake line of a household clothes washing machine. Feed water to the A/P cartridge averaged 10 ppm Fe and 0.5 ppm Mn. Water leaving the A/P cartridge and feeding the washer had non-detectable iron and manganese, was colorless, and did not stain clothing.

In an average household, a 2 liter A/P cartridge can provide iron-free, manganese-free water for a period of several months. In this example, A/I and/or A/M are formed in-situ with indigenous Fe and/or Mn. Indigenous arsenic co-mingled with naturally occurring iron or manganese binds to the in-situ generated matrix.

Example 11

A/P Particles for Coliform Removal

The studies of Example 4 were repeated using A/P instead of the organic polymer to remove the bacteria. The conditions used and the results obtained were substantially identical when using A/P particles. A/P is nonflammable and can be useful in aircraft cabin air filters in dry form.

Example 12

A/P Particles to Mitigate Mercury from an Aqueous Composition

A glass chromatographic column with bottom porous glass frit and bottom Teflon® stop-cock was loaded with 25 mL (settled volume) of A/P particles added to a standing volume of 50 mL of deionized water. Any air trapped in the A/P bed was expelled by gentle rocking of the column. Flow was initiated by opening the stop-cock partially and manually adjusting flow at about 10 mL/minute, while periodically adding fresh deionized water to the top opening of the column to maintain a 2–10 cm head over the A/P.

Next, 500 mL of a standard solution containing 100 ppm of mercuric salt (nitrate) was periodically added to the top opening of the column, while maintaining a flow rate of approximately 10 mL/minute. Fifty mL fractions eluting from the column were tested for mercury (diphenylcarbazone test (see Feigl, *Qualitative Analysis By Spot Test*, Elsevier Publishers, 1946 p. 48) at a sensitivity of detection of 5 ppm. All fractions tested at less than 5 ppm, indicating removal efficiency of removal of more than 95 percent.

During the course of mercury standard addition, a distinct orange colored band formed at the top of the A/P bed (white), which lengthened during the course of the challenge. Measurement of the colored band height compared to the total height of the 25 mL extrapolates to an approximate capacity of one pound of mercury per cubic foot of A/P medium. Because A/P is non-flammable, mercury captured by A/P is recoverable by conventional roasting/retorting techniques.

Example 13

Use of A/P Particles for the Mitigation Cobalt in Aqueous Streams

An apparatus and procedure similar to that described in Example 12 was employed to investigate mitigation of cobalt (II) from an aqueous stream, e.g., a chromatographic column was loaded with 25 cc of A/P particles and challenged with a 500 ppm ($Co^{+2}$; cobaltous) cobalt (II) standard solution. Fractions of 50 mL were collected and scrutinized for cobalt content using test strips sensitive to 10 ppm (EM Science, Gibbstown, N.J.). The pH value was maintained at 6–7 and flow rate was maintained at approximately 0.5 bv/minute.

During the course of the cobalt (II) challenge, an olive green band formed on the top of the A/P column, which lengthened as the test proceeded. All fractions tested negative for cobalt indicating more 98 percent mitigation of cobalt (II) added. Cobalt is problematic for the nuclear power industry where radioactive $cobalt^{60}$ contaminates certain process waste water. A/P particles with sorbed $Co^{60}$ can be integrated into ceramics or concrete for ultimate disposal.

Example 14

A/I Particles for Removing Arsenic (V) or Antimony (V) from Aqueous Streams Using a laboratory glass column (described in Example 13 and 14) 25 cc of A/I particles (Example 8) was loaded and equilibrated with deionized water. A challenge of tap water spiked with 500 parts per billion (ppb) of arsenic (V) was passed through the A/I bed while periodically examining effluent for arsenic (Hach test kit, Loveland, Colo.; sensitivity: 10 ppb).

In this example, arsenic-spiked test water was delivered from a reservoir and onto the column by means of a peristaltic pump set to deliver 15 mL/minute. In total, 1200 bed volumes (30 liters) of test sample were passed through the column. Arsenic determinations were made on each 1 liter increment of effluent and revealed less than 10 ppb arsenic on all fractions by the Hach test. Effluent samples further concentrated to 1/10 their original volume (U.S. Pat. No. 5,908,557) revealed effluent arsenic concentration of less than 1 ppb.

When this example was repeated using 500 ppb antimony (V) spiked tap water, effluent water revealed less than 5 ppb antimony as determined by atomic absorption.

Example 15

Comparison of A/I Particles to Particles Prepared as in WO 99/50182

An iron oxide-alumina composite described in WO 99/50182 is commercially available (Alcan Aluminum Co., Brockville, Ontario, Canada) as AAFS50. That material is further described by its manufacturer as alumina containing 6.0 percent $Fe_2O_3$ (about 4.2 percent Fe) by weight. Although plain activated alumina has an inherent ability to bind arsenic V, clearly, as demonstrated in WO 99/50182, AAFS50 is a vastly superior adsorbent for arsenic as compared to plain activated alumina.

A/I particles of this invention contain a calculated maximum of 0.7 percent by weight of Fe. Visually, A/I appears to have a darker, more intense and uniform rust color compared to AAFS50 particles that are speckled, non-uniform, an much lighter in color. AAFS50 particles subjected to crushing (mortar and pestle) reveal a white core within the particle indicating a coating of $Fe_2O_3$ on the exterior. Similar crushing of A/I particles reveal a uniform, dark rust color throughout the particles.

Accelerated performance comparisons with A/I and AAFS50 particles were made on the chromatographic format previously described utilizing a 1000 ppb (1 ppm) $As^{+5}$ challenge applied at 0.25 bv/minute. At this level of challenge, AAFS50 particles revealed a "breakthrough" of 10 ppb at about 500 column volumes, whereas A/I particles did not show a 10 ppb $As^{+5}$ breakthrough until after 600 bv. This example demonstrates that the total quantity of Fe present (AAFS20=4.2 percent) A/I=0.7 percent) is not as important as how the iron is presented to the challenge stream.

It is not known how the coating process for AAFS50 particles affects the effective porosity of the sorbent particles. The significant improvement (more than 20 percent) of A/I particles in capturing arsenic V in spite of having 1/6 the amount of total Fe may be due in part to the nature of the iron/iodine oxide/alumina complex and in part to a more functionally effective pore structure.

The capacity of a particular sorbent for a target ion is only one measure of efficiency. Another important parameter of efficiency is the rate at which a sorbent takes up and mitigates a target ion down to acceptable levels. When the experiment related in this example was repeated at increased flow rate (1.0 bv/minute vs. 0.25 bv/minute) arsenic at levels more than 10 ppb were noticed instantly in the effluent of the AAFS50 column, whereas no arsenic was detected in the effluent of the A/I column at 1.0–2.0 bv/minute. Thus, A/I particles sorb $As^{+5}$ at a rate that is at least 4 times faster than sorption by AAFS50 particles. In practical terms, a column containing A/I particles to mitigate $As^{+5}$ need only be 1/4 the size of a column of AAFS50 particles to process the same amount of water in the same amount of time.

Example 16

A/M Particles to Mitigate $As^{+5}$ or $As^{+3}$

Twenty-five mL of A/M particles (Example 8) were challenged with tap water containing 500 ppb of added $As^{+5}$ or unchlorinated well water containing 500 ppb of added $As^{+3}$ using the same chromatographic protocol described in Example 13. A/M particles bound all (more than 99 percent) arsenic (either $As^{+5}$ or $As^{+5}$) applied. Effluent tested for manganese revealed non-detectable amounts. It is thought that manganese present in A/M particles is tetravalent causing oxidation of $As^{+3}$ to $As^{+5}$. Any Mn II produced from such a reaction remains insoluble.

Each of the patents and articles cited herein is incorporated by reference. The use of the article "a" or "an" is intended to include one or more.

The foregoing description and the examples are intended as illustrative and are not to be taken as limiting. Still other variations within the spirit and scope of this invention are possible and will readily present themselves to those skilled in the art.

What is claimed:

1. A process for removing iron, manganese, mercury and cobalt ions from a water supply that comprises the steps of:
    a) contacting an aqueous solution that contains one or more of iron, manganese, mercury and cobalt ions in a concentration greater than about 2 parts per billion with modified alumina particles, said modified alumina particles containing meta-periodate ions sorbed substantially homogeneously distributed throughout in an amount of about 0.05 to about 0.15 molar as measured in a gravity-settled volume of particles in deionized water;
    b) maintaining said contact for a time period sufficient for the one or more of said iron, manganese, mercury and cobalt ions present to be sorbed by the particles to form particles containing one or more of iron, manganese, mercury and cobalt, and an aqueous solution having a lessened amount of one or more of iron, manganese, mercury and cobalt ions; and
    c) separating said formed particles containing one or more of iron, manganese, mercury and cobalt from said aqueous solution having a lessened amount of iron, manganese, mercury and coblat ions.

2. Particulate alumina containing iron substantially homogeneously sorbed throughout the particles, wherein said iron is present in an amount of about 0.1 to about 0.15 molar in a gravity-settled volume of particles in deionized water, said particles containing an oxidized iodine species and being substantially free of molecular iodine.

3. Particulate alumina containing manganese substantially homogeneously sorbed throughout the particles, wherein said manganese is present in an amount of about 0.05 about 0.075 molar in a gravity-settled volume of particles in deionized water, said particles containing an oxidized iodine species and being substantially free of molecular iodine.

4. A process for removing arsenic or antimony +3 or +5 ions from a water supply that comprises the steps of;
    a) contacting an aqueous solution that contains arsenic or antimony +3 or +5 ions in a concentration greater than about 2 parts per billion with modified alumina particles, said modified alumina particles containing iron or manganese or both sorbed substantially homogeneously distributed throughout in an amount of about 0.05 to about 0.15 molar as measured in a gravity-settled volume of particles in deionized water, said particles also containing an oxidized iodine species and being substantially free of molecular iodine;
    b) maintaining said contact for a time period sufficient for arsenic or antimony +3 or +5 ions present to be sorbed by the particles to form arsenic- or antimony-containing particles and an aqueous solution having a lessened amount of arsenic or antimony; and
    c) separating said arsenic- or antimony-containing particles from said aqueous solution having a lessened amount of arsenic or antimony.

5. The process according to claim 4 wherein said particles are modified with iron, and said iron is present in an amount of about 0.10 to about 0.15 molar.

6. The process according to claim 4 wherein said particles are modified with manganese, and said manganese is present in an amount of about 0.05 to about 0.075 molar.

7. The process according to claim 4 wherein prior to step (a), said aqueous solution is contacted with a water-insoluble polymeric medium having a plurality of polymerized N-pyridinium vinylbenzyl triiodide or tribromide moieties of the structure

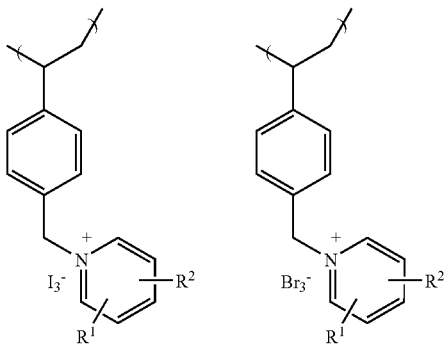

wherein $R^1$ and $R^2$ are independently a hydrido or a $C_1$–$C_4$ alkyl group;

maintaining said solution in contact with said insoluble medium for a time period sufficient for said trivalent arsenic or trivalent antimony in the influent to react with said oxidizing sites to form a pentavalent arsenic-containing or pentavalent antimony-containing sample solution and a reduced medium;

separating the pentavalent arsenic-containing or antimony-containing sample solution from the reduced medium; and using the separated pentavalent arsenic-containing or antimony-containing sample solution as said aqueous solution of step (a).

8. The process in accordance with claim 7 wherein said $R^1$ and $R^2$ substituents are both hydrido groups.

* * * * *